United States Patent [19]

Ito

[11] Patent Number: 4,488,429
[45] Date of Patent: Dec. 18, 1984

[54] METHOD AND APPARATUS FOR MEASURING INJECTION AMOUNT OF FUEL INJECTOR

[75] Inventor: Shinzo Ito, Aichi, Japan
[73] Assignee: Nippondenso Co., Ltd., Kariya, Japan
[21] Appl. No.: 438,723
[22] Filed: Nov. 3, 1982

[30] Foreign Application Priority Data

Nov. 4, 1981 [JP] Japan .................... 56-176857

[51] Int. Cl.³ ............................. G01M 15/00
[52] U.S. Cl. ................................... 73/119 A
[58] Field of Search ................. 73/119 A, 232, 1 H

[56] References Cited

U.S. PATENT DOCUMENTS

4,088,012  5/1978  Emerson ................ 73/119 A
4,266,426  5/1981  Gandini ................. 73/119 A

Primary Examiner—Jerry W. Myracle
Attorney, Agent, or Firm—Cushman, Darby & Cushman

[57] ABSTRACT

A cylinder connects a measuring chamber filled with fuel to a gas pressure chamber set at a constant pressure maintained by a gas pressure device. A displacement member in the form of a piston separates the gas pressure chamber from the measuring chamber. A fuel injector is mounted to communicate with the measuring chamber. A displacement sensor is disposed inside the gas pressure chamber and has a contact member of free-dropping type which contacts with the top surface of the displacement member. A displacement signal from the displacement sensor representing the amount of displacement of the displacement member is supplied to an arithmetic operation unit. A control circuit controls the injection operation of the fuel injector, and supplies a command to the arithmetic operation unit to calculate the injection amount from the amount of displacement.

19 Claims, 20 Drawing Figures

METHOD AND APPARATUS FOR MEASURING INJECTION AMOUNT OF FUEL INJECTOR

BACKGROUND OF THE INVENTION

The present invention relates to a method and an apparatus for measuring an injection amount of a fuel injector so as to allow high precision measurement of a small flow of a liquid, such as fuel for an engine, injected from an electromagnetic fuel injector.

In order to measure the injection amount of an electromagnetic fuel injector, fuel set under a pressure high enough for injection is supplied to the fuel injector. A predetermined number of, for example 1,000, injection drive pulses are supplied to the injector and fuel injected by the fuel injector is collected in a measuring cylinder. The amount of fuel collected in this manner is measured visually or with a scale. The average injected amount per injection operation, for example, is calculated from the amount of the collected and measured amount of injected fuel.

However, the injected amount per injection operation of such a fuel injector is as small as 0.001 to 0.1 cc (about 0.7 to 70 mg). Moreover, the injection period is also as small as 10 to 100 msec under normal engine conditions. For these reasons, it is almost impossible to measure the injection amount of fuel per injection operation of a fuel injector considering the response time (more than 1 sec) and the resolution (10 mg). The scale for measuring the collected fuel is subject to the effects of vibration or air flow at the installed location, and is poor in measuring precision even for 1,000 injection operations.

SUMMARY OF THE INVENTION

It is an object of the present invention to provide a method for measuring with high precision a small flow of a liquid, such as fuel for an engine, injected from a fuel injector.

It is another object of the present invention to provide an apparatus for measuring with high precision a small amount of fuel injected per injection operation of a fuel injector.

It is still another object of the present invention to provide a means for allowing effective continuous measurement of a flow from a fuel injector.

In the measuring means according to the present invention, a gas pressure set in a gas pressure chamber is made to act through a displacement member on a measuring chamber filled with liquid fuel to be measured and on a fuel injector communicating with the measuring chamber. A decrease in the volume of the liquid held in the measuring chamber due to injection of the liquid by the fuel injector is detected from the displacement of the displacement member. Accordingly, by reducing the fluctuation in the fuel pressure acting on the fuel injector and by making the displacement member follow the injection operation of the fuel injector, high-speed measurement of the injected amount of fuel per unit operation and hence high-precision measurement of the flow rate of the injected fuel is facilitated.

DETAILED DESCRIPTION OF THE PREFERRED EMBODIMENTS

Figure 1:
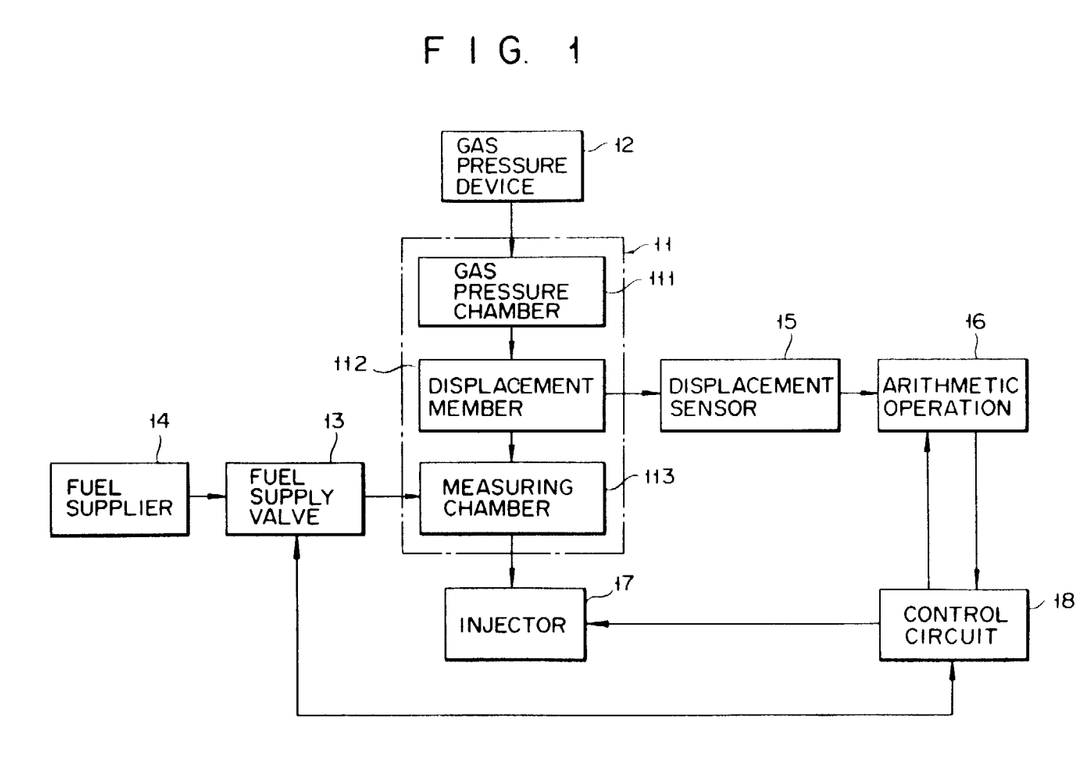
FIG. 1 is a schematic block diagram showing an apparatus for measuring an injection rate of a fuel injector according to an embodiment of the present invention.

FIG. 1 schematically shows a system for measuring the injection amount of an electromagnetic fuel injector. A measuring section 11 comprises a gas pressure chamber 111, a displacement member 112 and a measuring chamber 113. The gas pressure chamber 111 and the measuring chamber 113 are partitioned by the displacement member 112. A gas from a gas pressure device 12 set under a predetermined pressure is supplied to the gas pressure chamber 111 so as to set the chamber 111 at the same pressure.

Fuel from a fuel supplier 14 is supplied to the measuring chamber 113 through a fuel suppling valve 13. The measuring chamber 113 is defined by the displacement member 112 which is displaced in accordance with the amount of fuel supplied to the measuring chamber 113, that is, with the change in volume of the measuring chamber 113. The displacement of the displacement member 112 is detected by a displacement sensor 15. A displacement signal which represents the amount of displacement of the displacement member 112 and which is generated from the displacement sensor 15 is supplied to an arithmetic operation unit 16 to calculate the change in volume of the measuring chamber 113 corresponding to the amount of displacement of the displacement member 112.

An electromagnetic fuel injector 17 is mounted on the measuring chamber 113. When a fuel injection command is supplied from a control circuit 18, fuel from the measuring chamber 113 is injected by the fuel injector 17.

In correspondence with the fuel injection command to the fuel injector 17, the control circuit 18 supplies an operation command to the arithmetic operation unit 16 to detect the amount of displacement of the displacement member 112 corresponding to one injection operation. The arithmetic operation unit 16 then calculates the change in volume of the measuring chamber 113, that is, the injection amount of fuel from the fuel injector 17. After counting a predetermined number of injection operations, the control circuit 18 controls the fuel suppling valve 13 to replenish the fuel in the measuring chamber 113 so that the volume of the measuring chamber 113 can be such as to satisfactorily respond to the measuring operation. Fuel replenishment control of the measuring chamber 113 may alternatively be performed by detecting with the control circuit 18 if the volume of the measuring chamber 113 has fallen below a predetermined value on the basis of the detection result of the displacement member 112, and by supplying an opening command to the fuel suppling valve 13.

Figure 2:
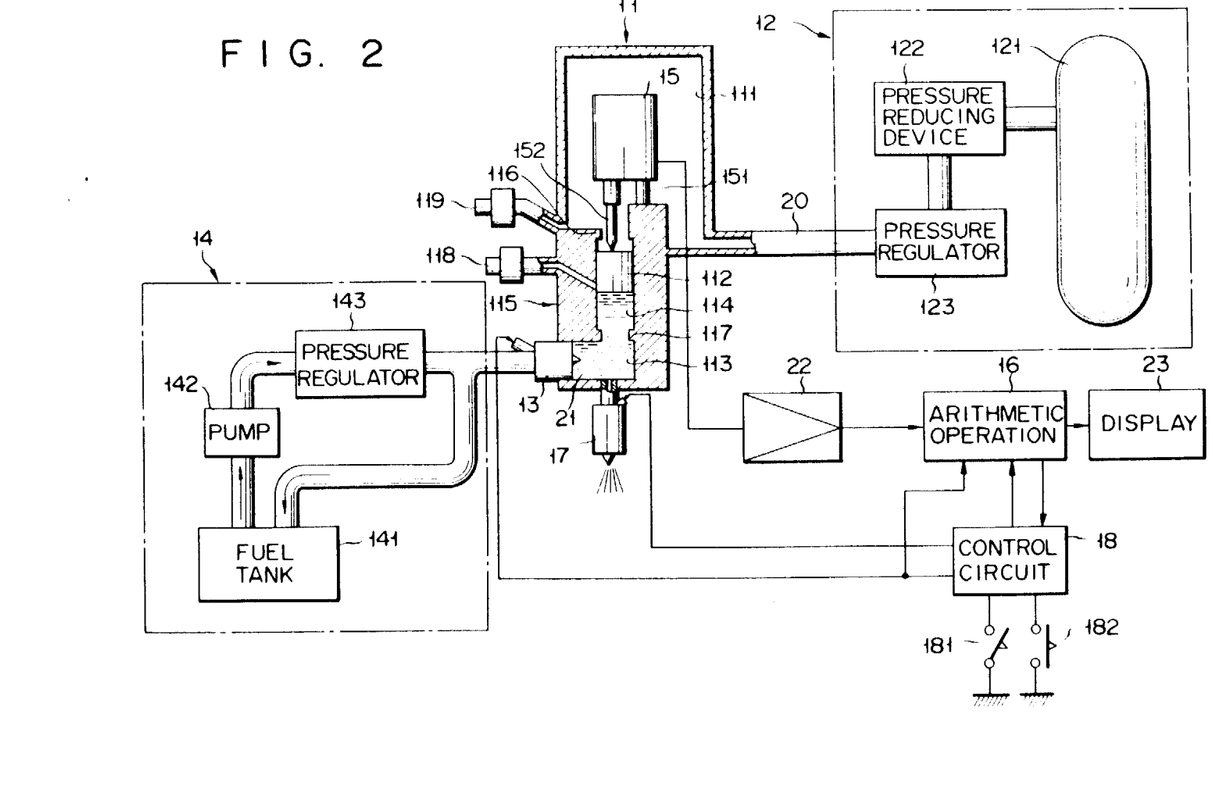
FIG. 2 is a view showing the detailed configuration of the apparatus shown in FIG. 1.

In FIG. 2, the gas pressure device 12 comprises an N₂ gas cylinder 121, a pressure reducing device 122 for lowering the pressure of gas supplied from the gas cylinder 121, and a pressure regulator 123 for keeping the output gas pressure at a constant value. The N₂ gas from the pressure regulator 123 is guided to the gas pressure chamber 111 of the measuring section 11 through a pipe 20.

The measuring section 11 has the measuring chamber 113 at its lower portion and also has a fuel reservoir 115 which has a cylinder 114 arranged vertically therein above the measuring chamber 113. The cylinder 114 communicates with the measuring chamber 113 to constitute part thereof. The displacement member 112 such as a piston is inserted in the cylinder 114. The displacement member 112 is reciprocally movable between upper and lower stoppers 116 and 117 formed at the upper and lower portions, respectively, of the cylinder 114. The vertical position of the displacement member 112 is determined by the volume of fuel 21 inside the measuring chamber 113. The sealed gas pressure chamber 111 is formed in correspondence with the upper opening of the cylinder 114 of the fuel reservoir 115. The pipe 20 communicates with the gas pressure chamber 111.

The displacement sensor 15 is fixed to the upper surface of the fuel reservoir 115 by a support column 151, inside the gas pressure chamber 111. The displacement sensor 15 has a free-dropping contact member 152 which is in contact with the upper surface of the displacement member 112. Thus, as the displacement member 112 moves vertically, the contact member 152 is displaced, and the amount of its displacement is detected by the displacement sensor 15 which generates an electric signal representing the amount. For example, the displacement sensor 152 generates pulses having a 90° phase difference in correspondence with the upward and downward displacement of the contact 152 and in accordance with the magnitude of the movement. More specifically, in response to a displacement of 0.1 μm of the contact member 152, one pulse is generated. The pulse is an up pulse or a down pulse having a 90° phase difference, in accordance with the upward and downward displacement, respectively, of the contact 152. The up pulse or down pulse as a displacement signal is amplified by an amplifier 22, is shaped, and is supplied to the arithmetic operation unit 16.

The configuration of the displacement sensor 15 is not limited to that described above and various other known configurations may be adopted. For example, an ultrasonic meter or a laser meter for detecting the amount of displacement of the displacement member 112 directly without the contact member may be used. Alternatively, the amount of displacement of the contact member 152 may be detected by a differentiating transformer, an eddy-current displacement sensor or the like.

The arithmetic operation unit 16 receives an up pulse or a down pulse from the displacement sensor 15 as a displacement signal, as well as timing signals representing the start and end timings of the measuring operation from the control circuit 18. In accordance with these timing signals, the unit 16 digitally calculates a change in volume of the measuring chamber 13 which corresponds to the detected amount of displacement of the contact member 152. The obtained change is digitally displayed by a display 23. The control circuit 18 has a fuel supply command switch 181 and a measurement start command switch 182. Upon depression of the fuel supply command switch 181 by the operator, the control circuit 18 supplies an opening command to the fuel supplying valve 13. The fuel supplying valve 13 communicates with the fuel supplier 14 which consists of a fuel tank 141, a pump 142, and a pressure regulator 143. As the fuel supplying valve 13 is opened, fuel is supplied under pressure to the measuring chamber 113. The fuel injector 17 is mounted on the measuring chamber 113, and fuel is supplied to the fuel injector 17 under the pressure of the gas pressure chamber 111. The fuel injector 17 is opened by a control drive signal from the control circuit 18 to inject fuel supplied to the measuring chamber 113.

An air exhaust valve 118 for discharging air from the measuring chamber 113 to the exterior is arranged in the cylinder 114 housing the displacement member 112. At the top dead center where the displacement member 112 contacts the upper stopper 116, the air exhaust valve 118 communicates with the measuring chamber 113. A fuel exhaust valve 119 for exhausting fuel leaked through the displacement member 112 is mounted on the gas pressure chamber 111.

Figure 3:
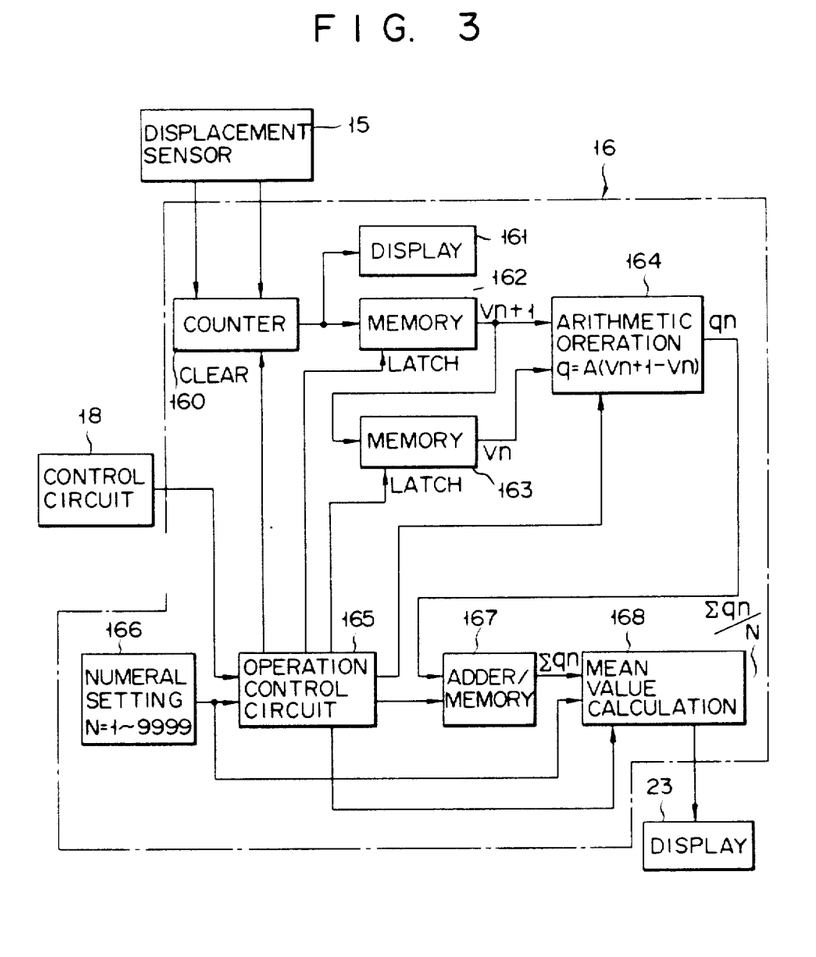
FIG. 3 is a block diagram showing an arithmetic operation unit shown in FIGS. 1 and 2 in more detail.

FIG. 3 shows the basic configuration of the arithmetic operation unit 16. The arithmetic operation unit 16 has a counter 160 which counts the up pulses or the down pulses, the number of which corresponds to the amount of displacement of the displacement member 112 detected by the displacement sensor 15. The count data of the counter 160 is displayed by a display 161 and is also supplied to a first memory 162. Storage data "$V_{n-1}$" in the first memory 162 is supplied to a second memory 163 and is also supplied to an arithmetic operation circuit 164 together with storage data "$V_n$" of the second memory 163. The arithmetic operation unit 16 further has an operation control circuit 165 which receives an operation command from the control circuit 18. The operation control circuit 165 supplies operation commands to the arithmetic operation circuit 164, latch commands to the first and second memories 162 and 163, and a clear command to the counter 160. The operation control circuit 165 receives from a numeral setting circuit 166 numeric data N where N is 1 to 9,999.

Operation data "qn" from the arithmetic operation circuit 164 is supplied to an adder/memory 167 which receives a command from the operation control circuit 165. Sum data "$\Sigma qn$" from the adder/memory 167 is supplied to a mean value calculation circuit 168 together with the numeric data from the numeral setting circuit 166. The mean value calculation circuit 168 calculates the mean value of the amount of fuel per injection operation, and the obtained mean value "$\Sigma qn/N$" is displayed by the display 23.

In a flow rate measuring apparatus of the configuration as described above, operations for preparing for measurement are first performed. During these preparatory operations, the fuel injector 17 is mounted to a mount hole communicating with the measuring chamber 113 and thereafter the fuel supply command switch 181 is operated. Then, a fuel supply control signal is supplied to the fuel supplying valve 13 from the control circuit 18 to supply fuel into the measuring chamber 113 under a pressure set by the pressure adjustor 143. The measuring chamber 113 is thus filled with fuel, and the displacement member 112 is moved upward to abut against the upper stopper 116. When the air exhaust valve 118 is opened at this time, any air inside the measuring chamber 113 is exhausted. This air exhaust operation may be omitted if there is no gas present in the measuring chamber 113. The volume of the gas inside the measuring chamber 113 may be detected by the amount of downward movement of the displacement member 112 upon closing the air exhaust valve 118 and the fuel supplying valve 13. The elasticity of air is significantly greater than that of a liquid. Therefore, the decrease (determined by the volume of air) in the volume of the measuring chamber 113 by pressure P inside the gas pressure chamber 111 after closure of the air exhaust valve 118 and the fuel supplying valve 13 may be detected by the amount of downward movement of the displacement member 112.

After the air in the measuring chamber 113 is exhausted, the air exhaust valve 118 is closed and the fuel is supplied to the measuring chamber 113. The fuel supply command switch 181 is released, and the fuel supplying valve 13 is closed. The leading edge of the fuel supply control signal from the control circuit 18 is detected by the operation control circuit 165 of the arithmetic operation unit 16, and the counter 160 is cleared. Simultaneously, $N_2$ gas from the $N_2$ gas cylinder 121 is reduced in pressure by the pressure reducing device 122 to a specific pressure set by the pressure adjustor 123. The $N_2$ gas adjusted in pressure is then supplied to the gas pressure chamber 111 to set the interior of the gas pressure chamber 111 to a predetermined pressure.

Figure 4A:
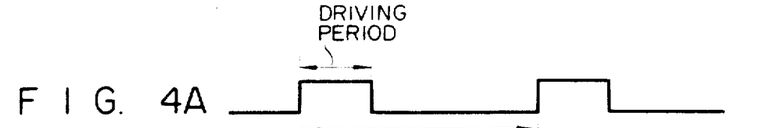
FIGS. 4A to 4F are timing charts for explaining the measuring operation of the apparatus shown in FIG. 1.
Figure 4B:
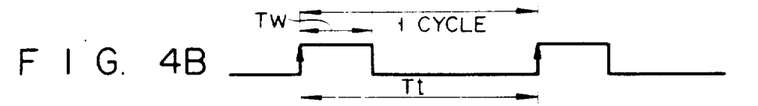

When the measurement start command switch 182 is operated after these preparatory operations, a drive signal having pulse width Tw and period Tt as shown in FIG. 4A and a timing signal for controlling the arithmetic operation unit 16 as shown in FIG. 4B are generated. The drive signal is supplied to the fuel injector 17 to open it. Then, fuel in the measuring chamber 113 is set at the pressure set in the gas pressure chamber 111 through the displacement member 112, thereby injecting fuel from the fuel injector 17.

Provided that the displacement member 112 is displaced at a sufficiently small velocity as compared to the pressure propagation velocity of the gas, variation $\epsilon p$ in pressure P acting on the displacement member 112 is given by:

$$\epsilon p = (PO - P)/PO = (A \cdot \Delta x)/(VO + A \cdot \Delta x)$$

where
PO: initial pressure in the gas pressure chamber 111,
VO: initial volume of the gas pressure chamber 111,
$\Delta x$: displacement of the displacement member 112,
A: cross-sectional area of the displacement member 112, and
P: pressure inside the gas pressure chamber 111 after displacement of the displacement member 112.

From the above equation, if the volume VO of the gas pressure chamber 111 is made sufficiently great compared to the displacement volume $(A \cdot \Delta x)$ of the displacement member 112, variation in the pressure may be rendered negligible, and a constant pressure may act on the displacement member 112.

The apparatus as described above was subjected to a performance test under the following conditions. The cross-sectional area of the displacement member was 2 $cm^2$; weight of the displacement member was 16 g; volume of the displacement member was 4 $cm^3$; sliding gap of the displacement member was 10 $\mu m$; volume of the gas pressure chamber was 10 l; pressure in the gas pressure chamber was 3 $kg/cm^2$; contact load of a linear scale (displacement sensor) was 20 g; pulse width Tw was 2.5 msec, pulse period Tt was 20 msec; injection rate was about 5 $mm^3$/pulse; and the fuel was a dry solvent. The pressure drop in the measuring chamber 113 during the injection period (the open period) of the fuel injector was less than 0.4% of the initial pressure.

Fuel leakage from the displacement member 112 during the non-injection period may be evaluated from the downward velocity of the displacement member 112. Since the displacement member 112 is subject to gas pressure, the magnitude of the downward velocity of the displacement member 112 is independent of the magnitude of the pressure P and is dependent upon the weight of the displacement member 112, the contact load of the displacement sensor 15, the sliding gap, the cross-sectional area of the displacement member, the viscosity and specific weight of the fuel, and so on. Therefore, the performance of the fuel injector 17 may be evaluated satisfactorily under a constant supply pressure.

In correspondence with the injection amount of the fuel injector 17 under control, the displacement member 112 is displaced, and the contact member 152 of the displacement sensor 15 is displaced at a free dropping velocity following the displacement member 112.

The displacement sensor 15 generates displacement pulses which correspond to the displacement of the contact 152. The amplifier 22 generates displacement pulses having a pulse width of, for example, 0.1 $\mu m$. In this case, up pulses or down pulses are generated in accordance with the direction of displacement of the contact. These up pulses or down pulses are up- or down-counted by the counter 160 of the arithmetic operation unit 16.

Figure 4C:
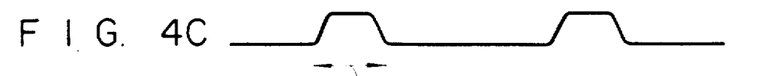
Figure 4D:
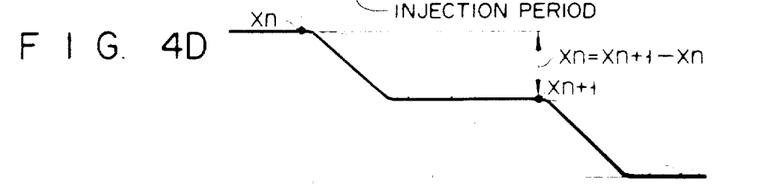
Figure 4E:
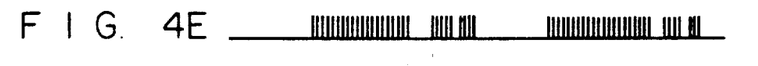
Figure 4F:
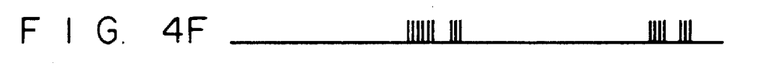

More specifically, the fuel injector 17 is controlled by the drive signal as shown in FIG. 4A. After a certain time delay, injection control is performed as shown in FIG. 4C to displace the displacement member 112 as indicated by the solid line in FIG. 4D. Then, the contact member of the displacement sensor 17 follows the movement of the displacement member 112 as indicated by the broken line in FIG. 4D. In correspondence with the direction of displacement of the contact, the up pulses or down pulses as shown in FIGS. 4E and 4F are generated.

As has been described earlier, the counter 160 up-counts in response to the up pulses and down-counts in response to the down pulses to provide count data which corresponds to the displacement of the contact member of the displacement sensor 15. The count data is displayed by the display 161. In response to the trailing edge of the timing signal from the control circuit 18 shown in FIG. 4B, the operation control circuit 165 generates a latch pulse to latch the count data of the counter 160 in the first memory 162 and to transfer the immediately preceding count data stored in the first memory 162 to the second memory 163. Thus, the first memory 162 stores the storage data "$V_{n+1}$" corresponding to displacement "$X_{n+1}$" of the current injection operation, and the second memory 163 stores the storage data "$V_n$" corresponding to displacement "$X_n$" of the immediately preceding injection operation. The arithmetic operation circuit 164 calculates:

$$q_n = A(V_{n+1} - V_n)$$

where

A: cross-sectional area of the displacement member 112, and qn: operation data representing volume of fuel injected per injection operation of the fuel injector 17.

One cycle of measurement of the amount of fuel injected per injection operation of the fuel injector 17 is performed in this manner. Measurements are sequentially repeated and, operation data qn from the arithmetic operation circuit 164 is accumulated in the adder/memory 167 for the number of times corresponding to the numeric data N set by the numeral setting circuit 166. The sum data "Σqn" from the adder/memory 167 is divided by N by the mean value calculation circuit 168 to calculate the mean amount of fuel injected for N injection operations. The mean value thus obtained is displayed by the display 23. When measurements for N injection operations are completed, a measurement end signal is generated by the operation control circuit 165. The control circuit 18 stops generating the drive signal and the timing signals, thus terminating the measuring operation.

When the displacement member 112 reaches the lower stopper 117, the fuel supply command switch 181 is operated to supply fuel to the measuring chamber 113, thus restarting the measuring operation.

In this embodiment, the cross-sectional area of the displacement member 112 is 2 cm$^2$, and the resolution of the displacement sensor 15 is 0.1 μm. Therefore, the injection rate measurement resolution is obtained as:

$$2 \times 10^2 \cdot 0.1 \times 10^{-4} = 0.02 \text{ mm}^3$$
$$= 2 \times 10^{-5} \text{ cc}$$

The weight corresponding to this may be calculated as:

$$0.7 \cdot 2 \cdot 10^{-5} = 14 \text{ μg}$$

if the specific weight of the fuel is about 0.7. This resolution is about an 80-fold improvement over 1 mg of a conventional meter.

If a laser is used in the displacement sensor 15 to provide a resolution of 0.01 μm, the overall resolution of 1.4 μg is obtained, which was hitherto unattainable with conventional meters.

In the embodiment described above, since a linear scale is used for the displacement sensor 15, a contact load may act on the displacement member 112, otherwise the contact member may not follow the displacement of the displacement member 112 which exceeds the free dropping velocity. However, if the contact member 152 is omitted and a non-contact-type displacement detector such as a laser or gap sensor is used, displacement of the displacement member 112 may be readily detected irrespective of its velocity and without exerting any load. In the embodiment described above, the displacement sensor 15 is an incremental sensor. However, if an absolute displacement sensor is used, the counter 160 of the arithmetic operation unit 16 may be omitted. Furthermore, in the embodiment, an amount of fuel is injected during the time a pulse which has a specific pulse width is supplied. However, if the pulse width of the drive signal is increased and the amount of fuel injected during a duration smaller than the pulse width is calculated, the fuel injection rate per unit time of the fuel injector 17 may be measured.

Figure 5:
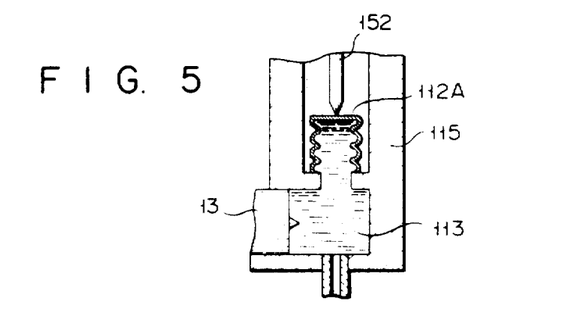
FIG. 5 is a sectional view showing another example of a displacement member for measuring the injection rate of a fuel injector.

In the embodiment described above, the amount of fuel injected during injection operation is detected. However, if the displacement of the displacement member upon closing the fuel injector 17 is detected, a leakage amount upon closure of the fuel injector 17 may be measured. If the ratio of "weight/volume" of the displacement member 112 is made equal to the specific weight of the fuel, the load exerted by the displacement member becomes zero due to buoyancy, which prevents fuel leakage and improves response time of the displacement member 112. The displacement member 112 is a piston in the embodiment described above. However, a bellows 112A may be used as shown in FIG. 5 to completely separate the gas pressure chamber 111 and the measuring chamber 113 from each other. Since leakage does not occur in this state, the N$_2$ gas cylinder 121 may be omitted if a gas under a specific pressure is once and for all sealed in the gas pressure chamber 111 as the constant pressure gas source.

In the embodiment described above, the constant pressure gas source is obtained by reducing the pressure of the N$_2$ gas from an N$_2$ gas cylinder to a value set by the pressure adjustor 123. However, the pressure source may be obtained by compressing ambient air by a pump.

Figure 6A:
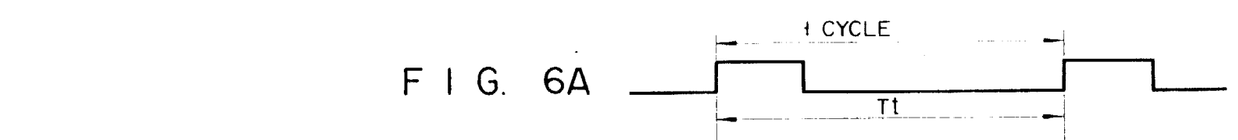
FIGS. 6A to 6D are timing charts for explaining continuous measurement of the injection rate with the apparatus shown in FIG. 1.
Figures 6B, 6C:
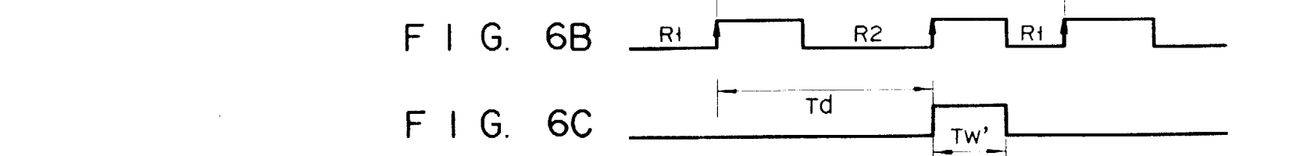
Figure 6D:
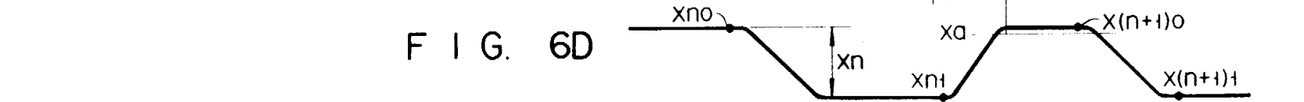

The fuel supply and measurement are performed in separate steps in the embodiment described above. However, a fuel supply command signal as shown in FIG. 6C may be generated at predetermined time Td after the drive signal shown in FIG. 6A. Generation of the fuel supply command signal is interrupted when the displacement member 112 reaches specific position Xa. If pulse width Tw' of the fuel supply command signal is smaller than the OFF period (Tt−Tw) of the drive signal, the amount of fuel injected by the fuel injector 17 for any required number of injection operations may be measured from the difference between displacement $X_{n0}$ of the displacement member 112 immediately before generation of the drive signal and displacement $X_{n1}$ immediately before generation of the fuel supply command signal, as shown in FIG. 6D. In order to reduce the pulse width Tw', the pressure in the fuel supplier 14 is set to be sufficiently greater than the internal pressure of the measuring chamber 113, or the valve diameter of the fuel supplying valve 13 is increased. FIG. 6B shows the timing signal.

In the description presented above, a drive signal is supplied to the fuel injector 17 to inject fuel, and the amount of fuel injected is measured. However, a configuration as shown in FIG. 7 may alternatively be adopted if a continuous drive signal is supplied to the fuel injector 17 to continuously supply fuel and the flow rate is measured in this condition.

Figure 7:
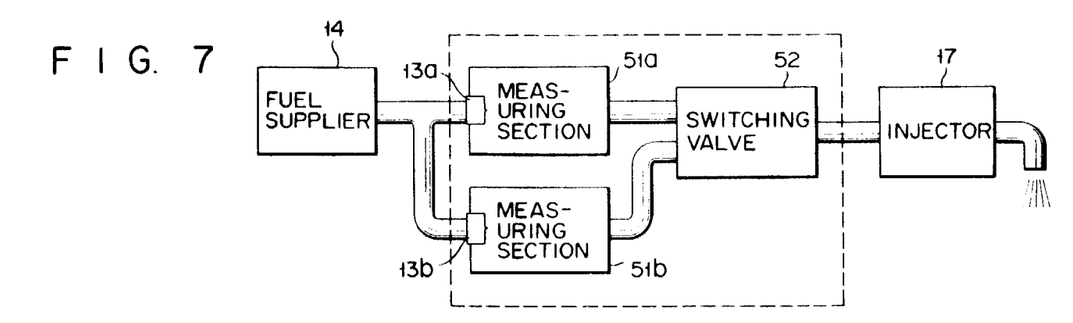
FIG. 7 is a schematic block diagram of another embodiment of the present invention.

In the apparatus shown in FIG. 7, the measuring section comprises at least two measuring sections 51a and 51b. Each of these measuring sections 51a and 51b comprises a gas pressure chamber 111, a displacement member 112 and a measuring chamber 113 as described with reference to FIGS. 1 and 2. A switching valve 52 is switched to communicate the measuring chamber of one of the measuring sections 51a and 51b with the fuel injector 17. In period T1, the switching valve 52 communicates the measuring section 51a with the fuel injector 17 to apply pressure to the fuel injector 17 by the measuring section 51a and to measure the amount of fuel injected by the fuel injector 17. At the same time, a fuel supply command signal is supplied to the meausuring section 51b to supply fuel. In period T2, the switching valve 52 communicates the measuring section 51b with the fuel injector 17 to measure the amount of fuel injected by the fuel injector 17. At the same time, a fuel supply command signal is supplied to the measuring section 51a to supply fuel to allow measurement of the flow rate of fuel continuously injected by the fuel injector 17.

Figure 8A:
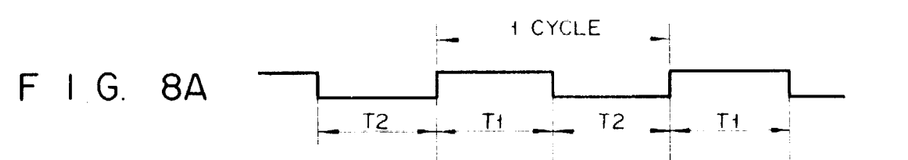
FIGS. 8A to 8E are timing charts for explaining the mode of operation of the apparatus shown in FIG. 7.
Figures 8B, 8C:
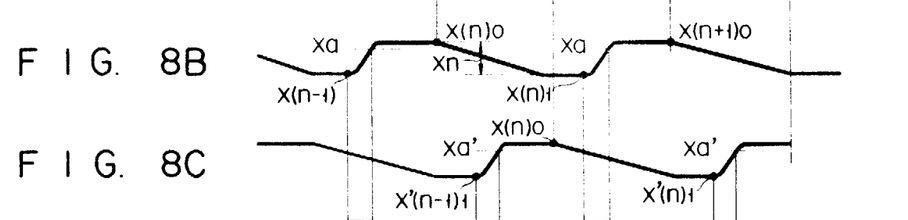
Figures 8D, 8E:
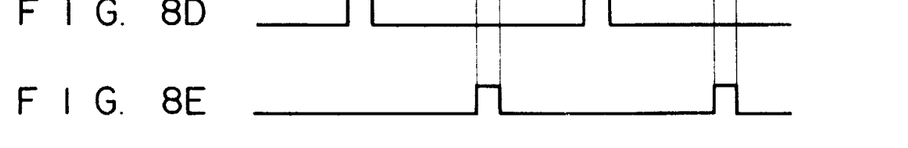

FIG. 8A shows a switching signal of the switching valve 52 of the apparatus shown in FIG. 7, and FIGS. 8B and 8C show displaced states of the displacement member by the measuring sections 51a and 51b. FIGS. 8D and 8E show fuel supply command signals supplied to fuel supplying valves 13a and 13b, respectively, for supplying fuel from the fuel supplier 14 to the measuring sections 51a and 51b.

What is claimed is:

1. An apparatus for measuring a fuel injection amount of a fuel injector, comprising:
    a gas pressure chamber set at a predetermined pressure;
    a measuring chamber which is defined contiguously to said gas pressure chamber and to which the fuel is supplied for storing fuel;
    a displacement member for separating said measuring chamber from said gas pressure chamber and which is urged against a surface level of the fuel inside said measuring chamber by the predetermined pressure of a gas in said gas pressure chamber;
    a displacement sensor for detecting an amount of displacement of said displacement member;
    a member for mounting said fuel injector so as to communicate said fuel injector with said measuring chamber; and
    a control circuit for measuring the amount of displacement of said displacement member from signals of said displacement sensor.

2. An apparatus according to claim 1, wherein a plurality of measuring sections each including said gas pressure chamber, said measuring chamber, said displacement member and said displacement sensor are arranged parallel to each other in correspondence with said fuel injector, and said plurality of measuring sections communicate with said fuel injector through a switching valve.

3. An apparatus according to claim 1, wherein said displacement member comprises a piston which is inserted into a cylinder of said measuring chamber.

4. An apparatus according to claim 1, wherein said displacement member comprises a bellows which partially defines said cylinder of said measuring chamber.

5. An apparatus according to claim 1, wherein a gas at a constant pressure is supplied to said gas pressure chamber from a pressure source.

6. An apparatus according to claim 5, wherein said pressure source comprises a high-pressure gas cylinder, a pressure reducing device for reducing a high pressure of a gas from said gas cylinder, and a pressure adjustor for setting the gas of a reduced pressure at the constant pressure.

7. An apparatus according to claim 6, wherein said high-pressure gas cylinder is filled with nitrogen gas.

8. An apparatus according to claim 5, wherein said pressure source comprises compressing means.

9. An apparatus according to claim 1, wherein said control circuit generates a drive signal for driving said fuel injector and reads the amount of displacement from said displacement sensor to control a calculation operation of the injection rate.

10. An apparatus according to claim 9, wherein the drive signal generated by said control circuit comprises a predetermined number of pulses which are consecutively generated, and said control circuit reads the amount of displacement from said displacement sensor in units of the predetermined number of drive pulses.

11. An apparatus according to claim 9, wherein the drive signal generated by said control circuit comprises a signal of a long duration so as to continuously inject the fuel from said fuel injector.

12. An apparatus according to claim 1, wherein said displacement sensor comprises means for detecting a reciprocal displacement of said displacement member, and means for converting an amount of reciprocal displacement of said detecting means into an up pulse and a down pulse in accordance with a direction of the reciprocal displacement.

13. An apparatus according to claim 12, wherein said detecting means comprises a contact member of free dropping type which is in contact with an upper surface of said displacement member which is displaced.

14. An apparatus according to claim 1, wherein
    said displacement member is formed such that its weight per volume is equal to the specific weight of the fuel inside said measuring chamber.

15. A method for measuring an injection amount of fuel injected by a fuel injector, comprising the steps of:
    filling with a liquid fuel a measuring chamber which is provided with an injector, where the amount of the fuel injected is to be measured, and defined by a displacement member;
    sealing a fuel passage to said measuring chamber, when said measuring chamber is filled with said liquid fuel, so as to prevent further supply of fuel;
    applying pressure of a gas upon said displacement member which defines said measuring chamber, so that the liquid fuel which is filled in said measuring chamber may act upon said injector;
    causing said injector provided at said measuring chamber to perform a fuel injection operation so that the fuel in said measuring chamber is forced out from the chamber; and
    detecting the amount of displacement of said displacement member as the fuel is forced out from said measuring chamber, thereby determining the outflow amount of fuel.

16. A method according to claim 15, wherein said fuel injector for injecting the fuel is controlled by a drive pulse of a predetermined pulse width.

17. A method according to claim 16, wherein a predetermined number of drive pulses are consecutively generated, and said fuel injector is controlled in accordance with the predetermined number of drive pulses.

18. A method according to claim 16, wherein the drive pulse is a signal of sufficiently long duration to allow continuous outflow of the fuel from said fuel injector.

19. A method according to claim 15, wherein control of said filling step is performed repeatedly by discriminating an amount of fuel from the amount of displacement of said displacement member.

* * * * *